United States Patent [19]
Ohno

[11] Patent Number: 4,714,387
[45] Date of Patent: Dec. 22, 1987

[54] GEAR CUTTING PROCESS
[75] Inventor: Seishichi Ohno, Kawaguchi, Japan
[73] Assignee: Nissho Seiko Kabushiki Kaisha, Japan
[21] Appl. No.: 796,520
[22] Filed: Nov. 8, 1985
[30] Foreign Application Priority Data Nov. 13, 1984 [JP] Japan .................. 59-237645

[51] Int. Cl.⁴ ............................... B23F 23/10
[52] U.S. Cl. ........................ 409/51; 51/287; 82/DIG. 1; 409/136
[58] Field of Search ............ 409/135, 136, 12, 15, 409/51, 56, 57; 408/2; 82/DIG. 1; 51/165.73, 52 R, 56 G, 287

[56] References Cited
U.S. PATENT DOCUMENTS 2,221,127 11/1940 Bates .............. 82/DIG. 1 X
3,113,488 12/1963 Davenport .............. 409/15
4,530,626 7/1985 Sabbioni .............. 409/135 X

FOREIGN PATENT DOCUMENTS 2747883 5/1979 Fed. Rep. of Germany .......... 408/2

Primary Examiner—Z. R. Bilinsky
Attorney, Agent, or Firm—Lowe, Price, Leblanc, Becker & Shur

[57] ABSTRACT

There is disclosed a gear cutting method for cutting a work by a milling cutter of a gear cutting planar having a cutting blade formed in a shape similar to involute curve. It comprises setting the work on a table intermittently rotating on a bed of a main body of the gear cutting planar, measuring and obtaining a heat expanding amount of the work in advance, compensating the feeding amount and the processing pitch of the milling cutter according to expanded dimension of the work at the time when the work is expanded by cutting heat, and cutting the work from a lower part to an upper part thereof by the milling cutter.

3 Claims, 8 Drawing Figures

GEAR CUTTING PROCESS

BACKGROUND OF THE INVENTION

The present invention relates to a gear cutting method which can extensively shorten cutting hours.

There is known a method for cutting inner gears and outer gears in a large ring body having a diameter exceeding 1 m by using a pinion cutter and a hob cutter. According to this method, the objective gear is processed and finished into a gear having a predetermined dimension by incrementally feeding the pinion cutter of the hob cutter through a plurality of cutting processes. It is usual practice with such a conventional method to wait until the ring body cools down to its normal temperature every time each of the cutting processes is effected since its ambient temperature increases by cutting heat with every cut. Only after cooling is the next cutting process resumed; otherwise, the cutting operation is effected while maintaining the work in a constant temperature.

The reason for the above is that if the gear is attempted to be finished by a single cutting process by increasing the feeding amount, the ring body is expanded by cutting heat, which results in adjacent pitch errors, accumulative pitch errors, trace errors, etc. of the gears.

The conventional method requires not only a plurality of cutting processes, but also an extremely long time is required for waiting until the ring body cools down every time each cutting is effected. Accordingly, there exists such a serious problem since it takes about 24 hours to finish a piece of gear.

In order to solve the above problem, there has been proposed a method in which the whole ring body is cooled down during the cutting operation. It is possible to cut down the time required for cutting processes if this method is employed. However, there arise other problems such that it is complicated, time consuming additional work to put the whole ring body in, for example, a water tub for cooling, and to set the whole ring body to a gear planar and remove therefrom.

The present invention is accomplished in order to solve the above-mentioned problems inherent in the prior art.

SUMMARY OF THE INVENTION

It is therefore a general object of the present invention to provide a gear cutting method, wherein the gear cutting is accurately effected by only a single cutting process by compensating the feeding amount and the processing pitch of a milling cutter according to degree of heat expansion due to cutting heat. This object was accomplished as a result of a complete change of a thought process from the common sense in the prior art for eliminating unfavorable effect of the heat expansion due to cutting heat.

In order to accomplish the above object, there is essentially provided a gear cutting method for cutting a work by a milling cutter of a gear cutting machine having a cutting blade formed in a shape similar to an involute curve, comprising setting the work on a table intermittently rotating on a bed of a main body of said gear cutting planar, measuring and obtaining a heat expanding amount of said work in advance, compensating the feeding amount and the processing pitch of said milling cutter according to expanded dimension of said work at the time when said work is expanded by cutting heat, and cutting said work from a lower part to an upper part thereof by said milling cutter.

BRIEF DESCRIPTION OF THE DRAWINGS

The foregoing and other objects, features and advantages of the present invention will become apparent from the following detailed description of the preferred embodiments of the invention as illustrated in the accompanying drawings wherein.

DETAILED DESCRIPTION OF THE EMBODIMENTS

A preferred embodiment of the present invention will be described hereinafter with reference to the accompanying drawing.

Figure 1:
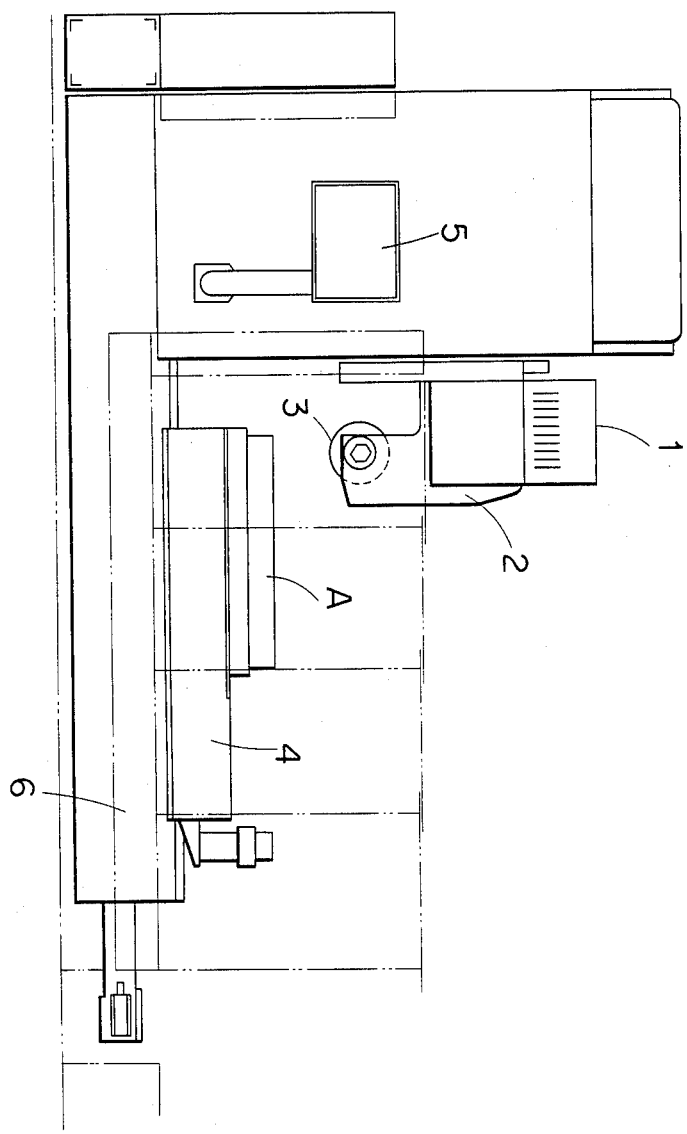
FIG. 1 is a side view of NC gear cutting machine adapted to carry out a gear cutting method according to the present invention.

FIG. 1 illustrates an NC gear cutting machine adapted to carry out a process according to the invention. In the figure, reference numeral 1 denotes a main body, 2 denotes a cutter head, 3 denotes a milling cutter, 4 denotes a table, and 5 denotes a control board.

Cutter head 2 moves in the vertical direction with respect to main body 1 by ball screw (not shown). Displaced at an upper part of cutter head 2 is a motor (not shown) for driving milling cutter 3.

Table 4 is rotatably mounted on a bed 6 of main body 1, and intermittently rotated by a predetermined pitch by a (motor not shown).

Figure 2A:
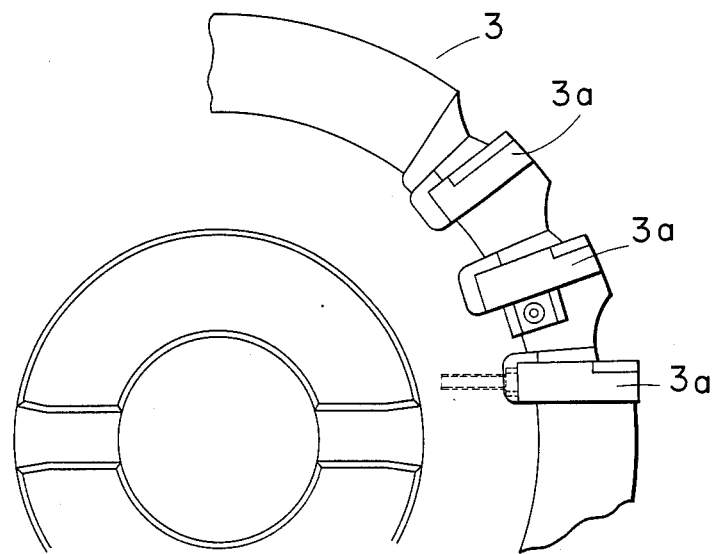
FIG. 2(a) is a side view of a part of a milling cutter used in a process according to the present invention.
Figure 2B:
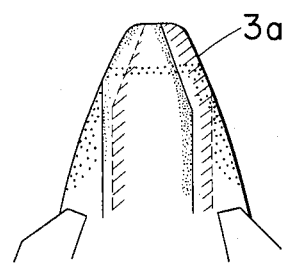
FIG. 2(b) is an enlarged sectional view of a cutting blade portion of the milling cutter.

FIGS. 2(a) and 2(b) illustrate milling cutter 3 in detail. A cutting blade 3a of milling cutter 3 is formed in a shape similar to an involute curve, so that a work can be finished through a single cutting process. It is noted that a milling cutter used in the conventional gear cutting method is made for rough processing, wherein the shape of a cutting blade is sharper than cutting blade 3a.

Next, a gear cutting method according to the invention will be described in detail.

Figure 3A:
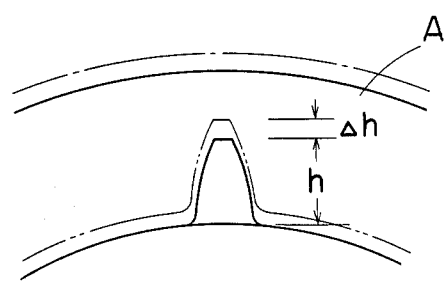
FIG. 3(a) is a schematic illustration for explaining the compensating amount of the feeding amount thereof.
Figure 3B:
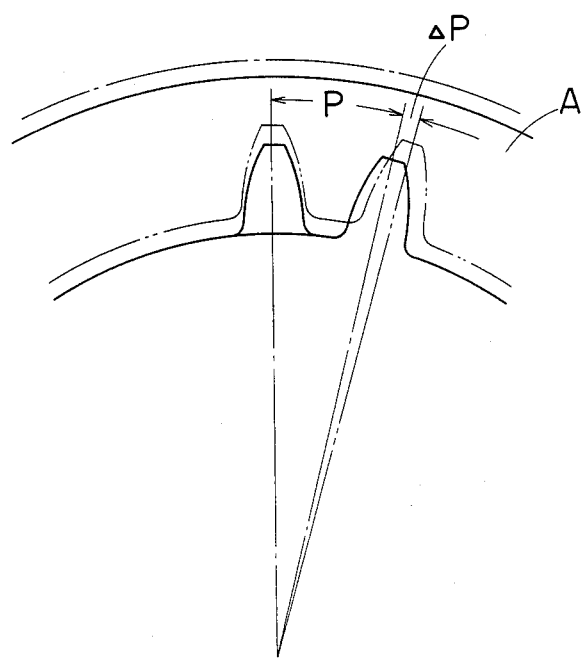
FIG. 3(b) is likewise a schematic illustration for explaining the compensating amount of the processing pitch thereof.

A ring body A is set on table 4 and the gear is finished through a single cutting process by moving milling cutter 3 rotated by cutter head 2 from a lower part of ring body A to an upper part thereof. As the gear cutting proceeds, ring body A expands due to cutting heat. In this embodiment, however, this heat expansion amount is obtained beforehand, and cutter head 2 and table 4 are properly controlled by controlling board 5 to compensate a feeding amount h of milling cutter 3 and a processing pitch P (see FIGS. 3(a) and 3(b)) thereof.

The compensating amount of feeding amount h and processing pitch P can be obtained as follows.

When the diameter of ring body A before heat expansion is set as $d_1$, and that after heat expansion as $d_2$, $d_2-d_1$ equals an expansion amount $\Delta d$ of the diameter.

When the number of gears is set as n, and the compensating amount of feeding amount h as $\Delta h$, the following relation is obtained.

$$\Delta d = 2 \times n \times \Delta h$$

Accordingly, $\Delta h$ equals $\Delta h/2n$.

Further, when the circumferential length of ring body A before heat expansion is set as $\pi d_1$, that of after heat expansion as $\pi d_2$, $\pi(d_2-d_1)$ equals an expanding amount $\pi\Delta d$ of the circumferential length.

When the number of gears is set as n, the compensating amount of processing pitch P as $\Delta P$, the following relation is obtained.

$$\pi\Delta d = n \times \Delta p$$

Accordingly, $\Delta P$ equals $\pi\Delta d/n$.

Accordingly, if the processing is effected by adding feeding amount h with $\Delta d/2n$, and processing pitch P with $\pi\Delta d/n$, the gear will be accurately finished in a predetermined dimension when ring body A recovers its normal temperature after processing.

In the above embodiment, feeding amount h of milling cutter 3 and processing pitch P thereof are compensated every time each of the gears is processed. However, the compensation may be effected every other, every two other, or every three other of the cutting processing of the gears. For example, when the compensation is effected every other, h becomes as follow, $$\Delta d = 2 \times n \times \tfrac{1}{2} \times \Delta h$$

$$\therefore \Delta h = \Delta d/n$$

and P becomes as follow, $$\pi\Delta d = n \times \tfrac{1}{2} \times \Delta P$$

$$\therefore \Delta P = 2\pi\Delta d/n$$

Since the cutting process is effected from a lower part of ring body A when the gears are cut and processed thereto, the cutting heat tends to be stored at an upper part of ring body A. Moreover, the upper part unlike the lower part is not discharged with the cutting heat through table 4. Accordingly, degree of heat expansion is greater at the upper part than the lower part thereof Thus, if an adjustment is made as such that feeding amount h and compensating amount h are larger at the upper part of ring body A than the lower part thereof, more accurate gear cutting process can be effected.

Figure 4:
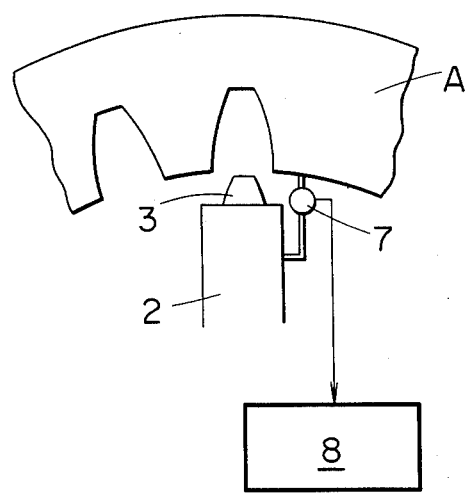
FIG. 4 is a schematic view showing another embodiment of the present invention.

FIG. 4 illustrates another embodiment of the present invention. In this embodiment, a sensor 7 adapted to measure the internal diameter of ring body A is contacted a portion corresponding to a gear tip to which the next cutting process will be effected in order to measure the heat expanding amount, and based on such obtained heat expanding amount, the compensating amount of feeding amount h and processing pitch P is computed by a computing element 8 to compensate feeding amount h and processing pitch P respectively.

In this way, feeding amount h and processing pitch P are gradually compensated in stages according to the heat expanding amount of ring body A.

Figure 5A:
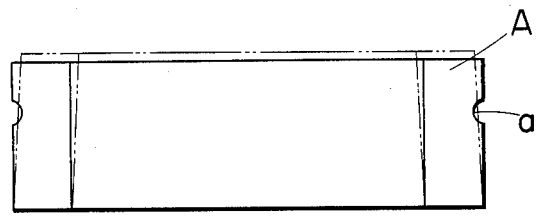
FIGS. 5(a) and 5(b) is a schematic view showing another processing example of the NC gear cutting machine of FIG. 1.
Figure 5B:
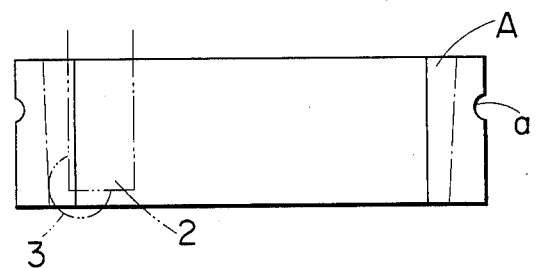

The NC gear cutting planar shown in FIG. 1 is adapted to carry out a gear cutting process according to the present invention, but it can also be used to compensate the feeding amount of milling cutter 3 as shown by a dotted chain line of FIG. 5(b) according to a deforming amount of ring body A which is deformed as shown by a two dotted chain line of FIG. 5(a) at the time when ring body A is quenched at a groove a formed in the outer periphery thereof as shown, for example, in FIG. 5(a).

As apparent from the foregoing description, according to the present invention, when a gear is cut by a milling cutter having a cutting blade formed in a shape similar to involute curve, the feeding amount and the processing pitch are compensated according to the dimension of a work (ring body A) at the time when the work is expanded due to cutting heat. Accordingly, the gear can be accurately finished in a predetermined dimension (about 4 grades of JIS) by a single cutting process. Further, it is no longer required to wait until the work cools down to a normal temperature. Thus, the gear cutting process can be timewise shortened to about 2 hours, whereas about 24 hours are required for the prior art.

Although the present invention has been fully described by way of example with reference to the accompanying drawings, it is to be noted that various changes will be apparent to those skilled in the art. Therefore, unless otherwise such changes depart from the scope of the present invention, they should be construed as being included therein.

What is claimed is:

1. A gear cutting method for cutting a work with a milling cutter of a gear cutting machine having a cutting blade formed in a shape similar to an involute curve, said gear cutting machine including a main body having a bed on which a table is rotatably mounted, comprising the steps of:
setting the work on the table intermittently rotating on the bed of said main body of said gear cutting machine;
measuring and obtaining a heat expansion amount of said work in advance;
compensating the feeding amount and the processing pitch of said milling cutter according to the expanded dimension of said work at the time when said work is expanded by cutting heat; and
cutting said work from a lower part to an upper part thereof by said milling cutter.

2. The gear cutting method of claim 1, comprising the further step of setting the feeding amount and a heat compensating amount of said milling cutter so as to be larger at an upper part of the work than a lower part of the work in contact with the table, whereby said upper part is out of contact with the table causing heat expansion of the upper part to be greater than the lower part.

3. The gear cutting method of claim 1, in which the further step of measuring the heat expansion amount of said work is made by means of a sensor positioned to measure the internal diameter of the work so as to establish the feeding amount and processing pitch to effect a next in line cut in said work.

* * * * *